United States Patent [19]
Cheever et al.

[11] Patent Number: 5,718,516
[45] Date of Patent: Feb. 17, 1998

[54] SPINDLE MOTORS WITH HARD COATED HYDRODYNAMIC BEARINGS

[75] Inventors: Charles J. Cheever, Beaverton; Frank Alton Gray, Portland, both of Oreg.

[73] Assignee: SAE Magnetics (H.K.) Ltd., Hong Kong

[21] Appl. No.: 627,488

[22] Filed: Apr. 2, 1996

[51] Int. Cl.$^6$ ................................. F16C 32/06
[52] U.S. Cl. .................... 384/114; 384/100; 384/107; 384/625
[58] Field of Search ................. 384/100, 107, 384/114, 625

[56] References Cited

U.S. PATENT DOCUMENTS

| | | | |
|---|---|---|---|
| 4,445,793 | 5/1984 | Shinohara | 384/130 |
| 4,726,693 | 2/1988 | Anderson | 384/114 |
| 4,795,275 | 1/1989 | Titcomb et al. | 384/107 |
| 4,838,710 | 6/1989 | Ohta et al. | 384/625 X |
| 5,067,528 | 11/1991 | Titcomb et al. | 141/4 |
| 5,112,142 | 5/1992 | Titcomb et al. | 384/107 |
| 5,366,298 | 11/1994 | Toshimitsu et al. | 384/107 |

OTHER PUBLICATIONS

U.S. Patent Application Serial No. 08/485,373, Improvements In Fluid Bearings For Electronic Spindle Motors, applicants Charles J. Cheever et al., filed Jun. 7, 1995.

U.S. Patent Application Serial No. 08/591,735, Filling Technique for Hydrodynamic Bearings, applicant Charles J. Cheever, filed Jan. 25, 1996.

*Primary Examiner*—Thomas R. Hannon
*Attorney, Agent, or Firm*—Chernoff, Vilhauer, McClung & Stenzel

[57] ABSTRACT

A spindle motor having hydrodynamic bearings formed between a hardcoated shaft with a radial thrust bearing plate substantially perpendicular to the axis of the shaft, a hard coated sleeve, and a hardcoated thrust ring. An axial bearing cavity is formed between the sleeve and the shaft. A first radial bearing cavity is formed between a radial surface of the sleeve and a lower radial plate surface. A second radial bearing cavity is formed between a lower surface of the thrust ring and an upper radial plate surface. Lubricant at least partially fills the cavities to form hydrodynamic bearings therein. The surface hard coats are preferably ceramic-like coatings such as titanium nitride, boron carbide, or Laser Cut 964. A method for fabricating a motor having hydrodynamic bearings includes the steps of machining motor components from a metal such as steel or bronze, coating the components with a surface hard coat, and assembling the motor.

9 Claims, 1 Drawing Sheet

SPINDLE MOTORS WITH HARD COATED HYDRODYNAMIC BEARINGS

BACKGROUND OF THE INVENTION

The following invention relates to electronic spindle motors having hard coated hydrodynamic bearings.

Electric spindle motors of the type used in disk drives conventionally rely on ball bearings to support a rotary member, such as a rotating hub, on a stationary member, such as a shaft. Rolling element or ball bearings are wear parts and, in time, friction will cause the motor to fail. In addition, ball bearings create debris in the form of dust or fine particles that can find their way into "clean" chambers housing the rotary magnetic disks which are driven by the motor. The mechanical friction inherent in ball bearings also generates heat and noise, both of which are undesirable in a disk drive motor.

Hydrodynamic or fluid bearings are often used as a replacement for ball bearings in disc drives and other apparatus having rotating parts. In a motor using a fluid bearing, the rotating member is separated from the stationary member by a film of lubricating fluid. A fluid bearing offers several advantages over ball bearings such as low non-repeatable run-out, low audible noise, and high damping. Accordingly, fluid bearings represent a considerable improvement over conventional ball bearings in spindle drive motors.

Examples of fluid bearings are shown in U.S. patent application Ser. No. 08/485,373 U.S. Pat. No. 5,536,088, and Ser. No. 08/591,735 to Charles J. Cheever, et al., which have been assigned to applicant's assignee and are incorporated herein. Other fluid bearings are shown in U.S. Pat. Nos. 5,112,142, 4,795,275, and 5,067,528 to Titcomb, et al. Still other types of fluid bearings are shown in Shinohara, U.S. Pat. No. 4,445,793 and Anderson, et al., U.S. Pat. No. 4,726,693.

Spindle motors often are subjected to severe conditions including approximately 250,000 stop/starts during the lifetime of the spindle motor at temperatures often exceeding 70° C. In a fluid bearing, at startup and when the motor is coasting down there is metal-to-metal contact. The effect of the wear resulting from this contact is minimized by the accuracy of the parts and the type of lubricant used, but these factors alone will not entirely eliminate wear. Conventional fluid bearing materials of steel and bronze are not sufficient in such extreme conditions.

One alternative to conventional fluid bearing materials is to fabricate motor components from ceramic materials. Because ceramic materials are harder than steel or bronze, they increase the life of a motor by minimizing wear. Ceramic materials, however, are extremely costly and often require a secondary machining operation (such as grinding) to maintain the precision geometry required for fluid bearings in spindle motors. Another alternative is to use hardened steel shafts, however this is also extremely expensive.

SUMMARY OF THE INVENTION

The present invention is directed to a spindle motor having hard coated hydrodynamic bearings. The motor includes hard coated components including a shaft with a surface hard coat, a sleeve with a surface hard coat, and a thrust ring with a surface hard coat. The surface hard coats function to reduce the wear often associated with surface-to-surface contact between motor components in motors with hydrodynamic bearings.

More specifically, the shaft includes a radial thrust bearing plate substantially perpendicular to the axis of the shaft. The thrust bearing plate has upper and lower radial plate surfaces and the shaft has an outer diameter. The sleeve has an inner diameter and a radial surface substantially perpendicular to the inner diameter. The inner diameter of the sleeve surrounds the outer diameter of the shaft below the thrust bearing plate to form an axial cavity therebetween. The radial surface of the sleeve is at least partially coextensive with the lower radial plate surface to form a first radial cavity therebetween. The thrust ring has a lower surface which is at least partially coextensive with the upper radial plate surface to form a second radial cavity therebetween. Lubricant at least partially fills the axial cavity, the first radial cavity, and the second radial cavity to form hydrodynamic bearings therein.

The surface hard coats are preferably ceramic-like coatings such as titanium nitride, boron carbide, or Laser Cut 964. Preferably the surface hard coats have a low melting point of approximately 950° F. When the surface hard coats are applied, the surface geometry of the motor components should remain unchanged because the hard coat can be applied evenly using an application method such as sputtering, chemical vapor deposition, or physical vapor deposition.

A method for fabricating a motor having hydrodynamic bearings includes the steps of machining motor components from a metal such as steel or bronze, coating the components with a surface hard coat, and assembling the motor. The step of assembling the motor includes applying lubricating fluid within the axial bearing cavity, the first radial bearing cavity, and the second radial bearing cavity. The step of coating includes coating the components with a ceramic-like coating using a sputtering method, chemical vapor deposition, physical vapor deposition, or other known methods.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
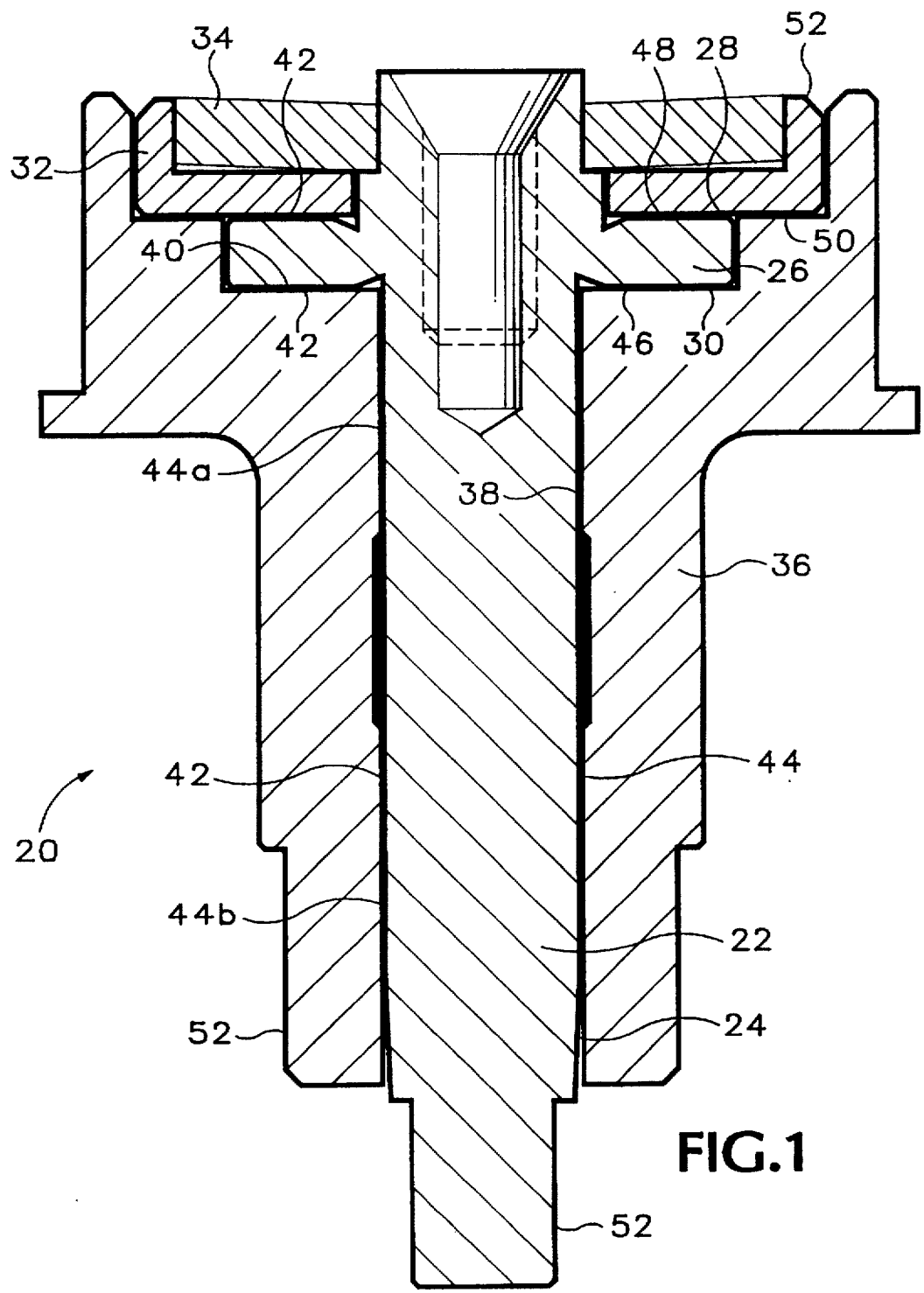
FIG. 1 is a side cutaway view of an electronic spindle motor having hard coated fluid bearings of the present invention.

FIG. 1 shows a compact electronic spindle motor 20 having a hard coated central shaft 22 with an outer diameter 24. (Although the hard coats are shown as thick lines in the figure, a preferred coating is extremely thin, usually measuring less than 1 (one) micron.) Perpendicular to and integral with the shaft 22 is a radial thrust bearing plate 26 that provides stability in the axial direction, that is, along the longitudinal axis of the shaft 22. The thrust bearing plate 26 has an upper radial plate surface 28 and a lower radial plate surface 30. The upper radial plate surface 28 supports a hard coated retainer or thrust bearing ring 32 which, in turn supports an end cap 34.

A hard coated annular sleeve 36 having an inner diameter 38 at least partially encloses the shaft 22. The sleeve 36 also has a radial surface 40 substantially perpendicular to the sleeve's inner diameter 38. The radial surface 40 of the sleeve 36 is at least partially coextensive with the lower radial plate surface 30.

The motor 20, when assembled, includes bearing cavities into which lubricant 42 is inserted to form hydrodynamic or fluid bearings. More specifically, an axial bearing cavity 44 is formed between the inner diameter 38 of the sleeve 36 and the outer diameter 24 of the shaft 22 below the thrust bearing plate 26. In one embodiment, axial bearing cavity 44 is divided into upper and lower axial bearings 44a and 44b. A first radial cavity 46 is formed between the radial surface 40 of the sleeve 36 and the lower radial plate surface 30 where these surfaces are coextensive. A second radial cavity 48 is formed between a lower surface 50 of the thrust bearing ring 32 and the upper radial plate surface 28 where these surfaces are coextensive.

Lubricating fluid 42 within the bearing cavities (44, 46, and 48) functions as fluid thrust bearings therein and separates rotating components of the motor from stationary components of the motor.

The present invention includes surface hard coatings 52 on the motor components so that the surfaces resist wear when they contact other surfaces. The surface hard coatings 52 may be used as an alternative to fabricating motor components from ceramic materials or hardened steel. Preferably, all motor components which have metal-to-metal contact with other components are coated because such contact can take place between various combinations of components depending on the operating orientation of the motor 20. By coating the shaft 22, sleeve 36, and thrust ring 32, maximum life is achieved.

One surface hard coating 52 that works well in this application is a ceramic-like coating such as titanium nitride (TiN). This material is commonly applied to cutting tools in the machine tool industry to extend life by minimizing tool wear. TiN is a viable selection since the coating is only one or two microns thick and goes on uniformly without affecting the geometry or surface finish. TiN coating is available from Balzers Tool Coating Inc. in North Tonawanda, N.Y. Alternative ceramic-like coatings which may be used include boron carbide (available from Diamond Black in North Carolina) and Laser Cut 964 (available from SAC International in Ohio).

Another possible hard coating 52 are ceramic coatings. Using ceramic materials as a coating, however, would require a high melting temperature of approximately 3,000° F. In contrast, ceramic-like coatings such as titanium nitride or boron carbide have low melting temperatures of approximately 950° F. Another problem with ceramic coatings is that they form a thick coating that requires additional grinding or other machining operations. Because ceramic-like coatings go on much thinner than ceramics, they do not require secondary machining operations. Finally, unlike ceramic-like coatings, ceramic coatings affect the surface geometry after they have been applied.

The method of coating motor components with a hard coating 52 makes it possible to fabricate the components using easy to machine materials (such as steel and bronze) thus making the machining of the motor components cost effective. It should be noted that the components might be machined slightly smaller than non-coated components to compensate for the coating. The hard coating 52 reduces the wear on the relatively soft components.

More specifically, the method for fabricating a spindle motor 20 having hydrodynamic bearings includes the steps of machining motor components from easy to machine metals such as steel or bronze, coating the components with a surface hard coat 52, and assembling the motor 20. The step of machining motor components may include forming grooves on the outer diameter of the shaft 22 or the inner diameter of the sleeve 36. The step of assembling the motor includes applying lubricating fluid 42 within the axial bearing cavity 44 between the shaft 22 and the sleeve 36, the first radial bearing cavity 46 between the radial thrust bearing plate 26 and the radial surface 40 of the sleeve 36, and the second radial bearing cavity 48 between the retainer 32 and the radial thrust bearing plate 26. The step of coating includes coating the components with a ceramic-like coating 52 such as with titanium nitride or boron carbide by melting the surface hard coat 52 at a low temperature of approximately 950° F. and applying the coating 52 using a sputtering method, chemical vapor deposition, physical vapor deposition, or other known methods.

The motor may be constructed using one or more coated motor components in combination with other non-coated, ceramic, or other type of components. Some possible combinations include: 1) Titanium Nitride (TiN) Coated Shaft, Ceramic Sleeve, TiN Coated Thrust Cap; 2) Titanium Nitride (TiN) Coated Shaft, TiN Coated Sleeve, Ceramic Thrust Cap; and 3) Titanium Nitride (TiN) Coated Shaft, Ceramic Sleeve, Ceramic Thrust Cap.

It should be noted that the bearing cavities 44, 46, and 48 may be tapered to encourage seals to form such as those disclosed in U.S. patent application No. 08/485,373 U.S. Pat. No. 5,536,088 to Charles J. Cheever, et al., which has been assigned to applicant's assignee and is incorporated herein by reference.

Grooves (not shown) may be provided on the outer diameter 24 of the shaft 22 or on the inner diameter 38 of the sleeve 36 to generate the appropriate fluid pressure gradient and hydrodynamic pressures to retain the lubricating fluid 42 within the bearing cavity 44. Similarly, grooves (not shown) may be provided on one or both surfaces of the bearing cavities 46 and 48. These grooves, shown in previously incorporated patents would be extremely difficult to incorporate in ceramic or hardened steel motor components.

It should be noted that any lubricating fluid such as oil may be used as a lubricating fluid 42. Preferably the lubrication fluid includes antifriction, antiwear, and antioxidant ingredients. In one embodiment, oil having the approximate viscosity of 30 Cs (centistrokes) at 20° C. is used, however, alternate fluids may be used for this purpose.

Finally, it should be noted that the invention may be adapted to work with spindle motors having a rotating shaft or stationary shaft.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A spindle motor having hydrodynamic bearings, comprising:
   (a) a metallic shaft having a ceramic-like surface hard coat directly thereon, said shaft having a radial thrust bearing plate substantially perpendicular to said shaft, said bearing plate having upper and lower radial plate surfaces, said shaft having a shaft outer diameter;
   (b) a metallic sleeve having a ceramic-like surface hard coat directly thereon, said sleeve having a sleeve inner diameter and a sleeve radial surface substantially perpendicular to said sleeve inner diameter, said sleeve inner diameter surrounding said shaft outer diameter below said bearing plate to form an axial cavity therebetween, said sleeve radial surface being at least partially coextensive with said lower radial plate surface to form a first radial cavity therebetween;

(c) a metallic thrust ring having a ceramic-like surface hard coat directly thereon, said thrust ring having a ring lower surface, said lower surface being at least partially coextensive with said upper radial plate surface to form a second radial cavity therebetween; and (d) lubricant at least partially filling said axial cavity, said first radial cavity, and said second radial cavity to form hydrodynamic bearings therein.

2. The spindle motor of claim 1 wherein said surface hard coats within said cavities substantially reduces wear thereof.

3. The spindle motor of claim 1 wherein said surface hard coats are titanium nitride.

4. The spindle motor of claim 1 wherein said surface hard coats are boron carbide.

5. The spindle motor of claim 1 wherein said surface hard coats have a melting point of approximately 950° F.

6. The spindle motor of claim 1 wherein surface geometry of said shaft, sleeve, and thrust ring is unchanged by said surface hard coats.

7. The spindle motor of claim 1 wherein said surface hard coats are sputtered onto said shaft, sleeve, and thrust ring.

8. The spindle motor of claim 1 wherein said surface hard coats are applied onto said shaft, sleeve, and thrust ring using physical vapor deposition.

9. A spindle motor having hydrodynamic bearings, comprising:

(a) metallic motor components including a shaft, a sleeve, and a thrust ring, wherein at least one of said motor components has a ceramic-like surface hard coat directly thereon;

(b) said shaft having a radial thrust bearing plate substantially perpendicular to said shaft, said bearing plate having upper and lower radial plate surfaces, said shaft having a shaft outer diameter;

(c) said sleeve having a sleeve inner diameter and a sleeve radial surface substantially perpendicular to said sleeve inner diameter, said sleeve inner diameter surrounding said shaft outer diameter below said bearing plate to form an axial cavity therebetween, said sleeve radial surface being at least partially coextensive with said lower radial plate surface to form a first radial cavity therebetween;

(d) said thrust ring having a ring lower surface, said lower surface being at least partially coextensive with said upper radial plate surface to form a second radial cavity therebetween; and (e) lubricant at least partially filling said axial cavity, said first radial cavity, and said second radial cavity to form hydrodynamic bearings therein.

* * * * *